Figure 1:
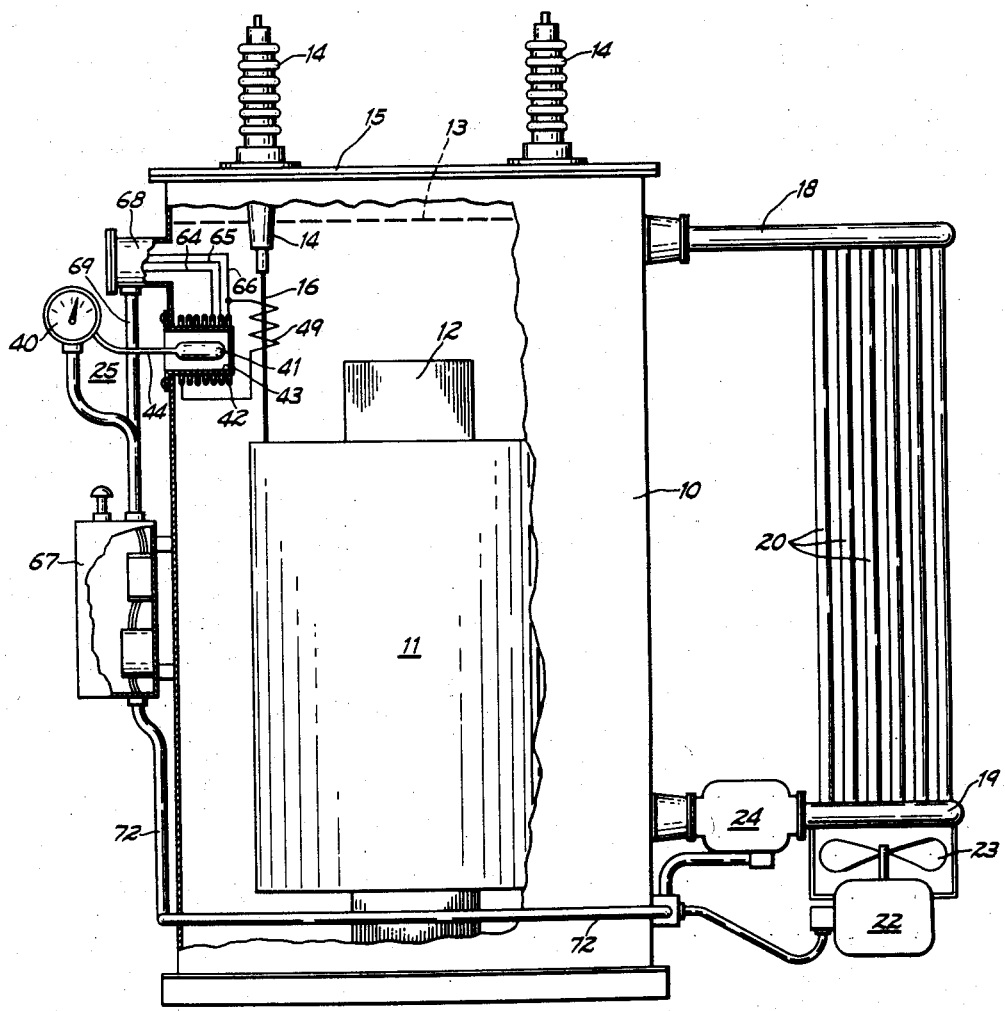

Dec. 15, 1959     H. D. SALTON     2,917,701
FORCED-COOLED TRANSFORMER HAVING WINDING TEMPERATURE RELAY
Filed Aug. 2, 1957     2 Sheets-Sheet 1

INVENTOR.
Harry D. Salton
BY Lee H Kaiser
Attorney

INVENTOR.
Harry D. Salton
BY Lee H. Kaiser
Attorney

United States Patent Office 2,917,701
Patented Dec. 15, 1959

2,917,701

FORCED-COOLED TRANSFORMER HAVING WINDING TEMPERATURE RELAY

Harry D. Salton, Canonsburg, Pa., assignor to McGraw-Edison Company, Milwaukee, Wis., a corporation of Delaware Application August 2, 1957, Serial No. 675,944

5 Claims. (Cl. 323—44)

This invention relates to stationary induction apparatus cooled by the circulation of an insulating fluid and in particular to encased stationary induction apparatus having forced cooling systems.

Stationary induction apparatus such as electrical transformers are often immersed in an insulating and cooling fluid within an enclosing casing, and cooling of the electrical winding of the transformer is accomplished by the circulation of the insulating and cooling fluid, either by natural convection or by fluid circulating means such as a pump or fan for forcing the fluid to flow in heat exchange relation with the apparatus. Both oil-immersed, forced air-cooled and oil-immersed, forced oil-cooled transformers are conventional, and the former dissipate their heat by forced air circulation over the tank or other cooling surfaces to which the oil flows by natural convection while the latter dissipate their heat by pumping the oil to the cooling surfaces of an oil-to-air or oil-to-water heat exchanger. The hot spot temperature of the winding of such transformers is conventionally measured by thermal responsive means within the casing responsive to both the temperature of the cooling fluid in which the transformer core and coil assembly is immersed and the magnitude of the current flowing in the transformer windings. Such thermally responsive, winding temperature indicating means commonly includes a current transformer in one of the leads to the transformer winding energizable in accordance with the current flow through the winding, a heating coil within the casing energized from the secondary of the current transformer and in heat exchange relation with the cooling fluid, and a thermal responsive element in heat exchange relation with the heating coil and the cooling fluid. Other winding temperature indicators may consist of a thermometer bulb immersed in the hot oil of the transformer to which the copper gradient is automatically added by means of a bimetallic thermal element heated by current proportional to the winding current. Both types of winding temperature indicators reproduce the hot-spot temperature as the sum of the hot oil temperature and the copper gradient.

The winding temperature measuring apparatus indicates a temperature which is the sum of three components, namely (a) ambient temperature, (b) dielectric fluid rise over ambient temperature, and (c) transformer winding temperature rise (hot spot temperature) over dielectric fluid. The thermal responsive element correctly indicates components (a) and (b) since it is in heat exchange relation with the dielectric fluid, and the current through the heating element in the secondary circuit of the current transformer can be calibrated to correctly indicate component (c) for a single condition of the forced cooling means, for example, when the pump of a forced oil-cooled transformer is operating or when it is not operating.

However, the hot spot rise of the transformer winding over the temperature of the dielectric fluid is much greater for a static fluid condition than when the pump is operating to circulate the fluid, or a fan is operating to circulate air over the cooling radiators, for the reason that considerably greater heat will be removed from the transformer winding when the fluid is circulated by the pumps or the fans circulate air over the cooling radiators than when the oil is static and no air is circulated by the fans. Consequently the temperature indicating apparatus will show an erroneous hot spot rise of the transformer winding over ambient unless means are provided to compensate for variations in the rate of cooling of the apparatus caused by the pumps or fans. Measuring the hot spot temperature correctly or calibrating a thermal responsive relay to operate at a predetermined hot spot temperature is particularly difficult on units having a plurality of kva. ratings wherein additional pumps, fans, or blowers are brought into operation to increase the rate of cooling for each higher rating of the transformer. For example, "triple rated" transformers conventionally have a "self-cooled" rating wherein cooling is effected entirely by circulation of the cooling fluid by natural convection as well as two higher kva. ratings for each of which a separate group of pumps, coolers, or fans is provided, and conventional winding temperature relays and indicators can be calibrated to give accurate hot spot temperature response at only one rating of the transformer.

It is an object of the invention to provide means in forced-cooled stationary induction apparatus having a winding temperature relay for controlling the forced cooling means to automatically recalibrate the winding temperature relay whenever the rate of cooling of the apparatus is varied.

It is a further object of the invention to provide means in a forced-cooled electrical transformer having thermal responsive apparatus adapted to indicate hot spot temperature and to operate the forced cooling pumps and fans at predetermined hot spot temperatures, for automatically compensating the response of the thermally responsive apparatus for variations in the rate of cooling of said apparatus.

Figure 2:
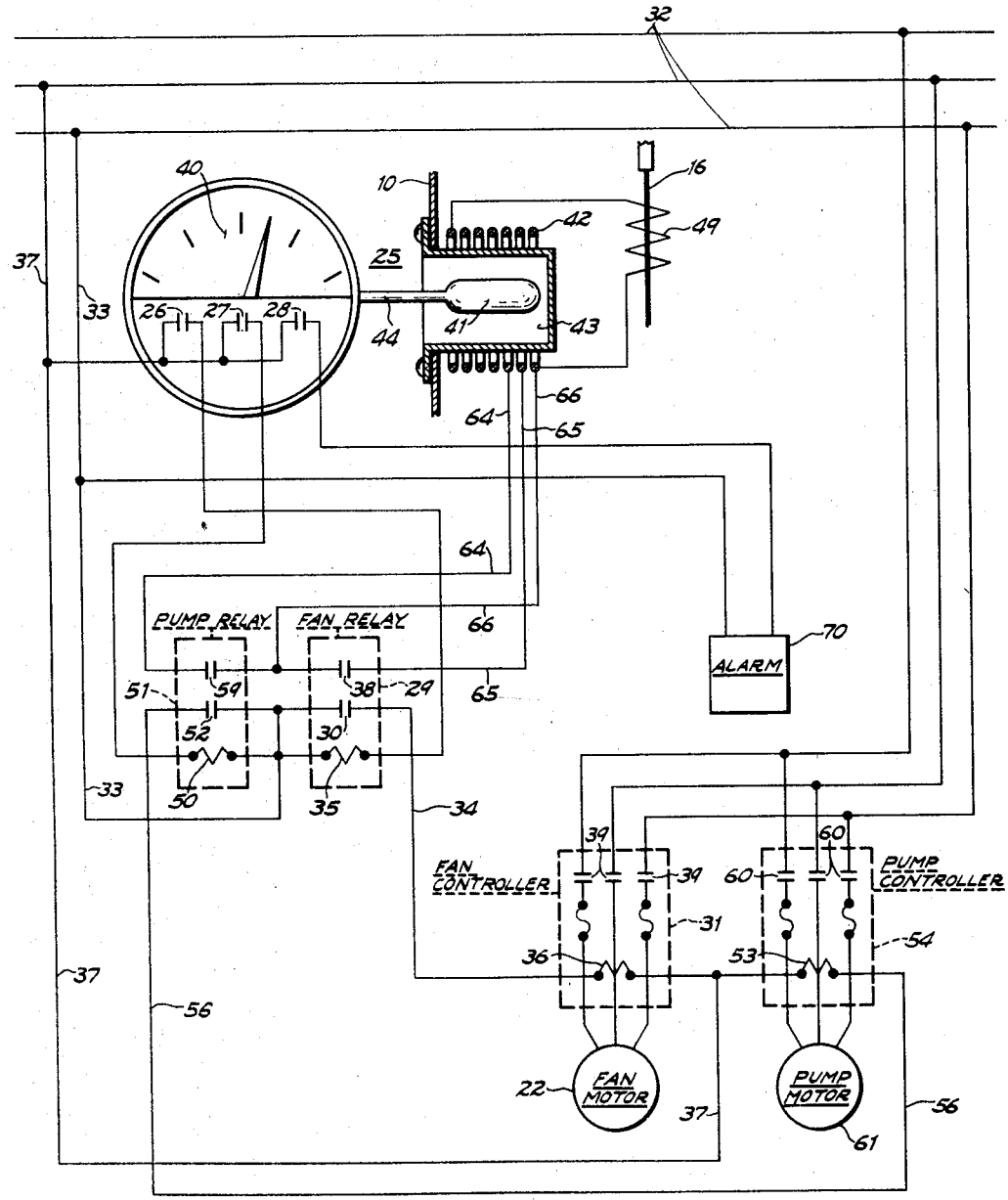

These and other objects and advantages of the invention will be better understood from the following description when taken in conjunction with the accompanying drawing wherein:

Fig. 1 is a view in side elevation of a forced-cooled transformer of conventional design which is equipped with response-compensated winding temperature control and indicating apparatus in accordance with my invention (a portion of which is illustrated by a schematic electric circuit diagram) and having a section cut away to show the arrangement of the elements; and Fig. 2 is a schematic electric circuit diagram of means in accordance with my invention for recalibrating the winding temperature apparatus whenever the rate of cooling of the stationary induction apparatus is varied.

Referring to the drawing, the invention is illustrated in an oil-immersed forced-cooled transformer having a casing 10 housing a conventional transformer core and coil assembly including an electrical winding 11 positioned on a magnetic core 12 immersed in a suitable dielectric insulating and cooling fluid 13, preferably transformer oil, within casing 10. Insulating bushings 14 passing through the cover 15 of casing 10 insulate the conductors 16 from the electrical winding 11 to the external circuits to which the electrical winding 11 is connected.

A cooler, or heat exchanger, for cooling the core and coil assembly includes an upper header 18 connected to the sidewall of casing 10 adjacent the upper end thereof and communicating with the interior of casing 10, a lower header 19, and tubular cooling radiators 20 between the headers 18 and 19 through which the cooling fluid 13 circulates by natural convection and which cool the oil by natural flow of air over the external surfaces of the radiators 20 at the "self-cooled" rating of the transformer.

When the oil 13 is heated by the electrical winding 11 it will ascend to the top of the transformer casing 10, since its specific gravity is decreased by expansion, and will flow into the upper header 18 and the upper end of radiators 20. As the oil in the upper end of radiators 20 is cooled, its specific gravity increases and it moves downward and continues to cool so that a continuous, natural convection, circulation of oil occurs in and about the windings 11 through the radiators 20. Such natural convection circulation of oil 13 through radiators 20 is adequate to dissipate the heat generated by windings 11 when the load on the transformer is below a predetermined kva. rating, which is the so-called "self-cooled" rating of the transformer.

The transformer is illustrated in the drawing as having both a forced-air and a forced-oil stage of cooling. The first stage of cooling is of the forced-air type wherein the heat dissipated can be increased materially in comparison to the self-cooled rating by energizing the motor 22 of a fan 23 to increase the flow of air over the cooling radiators 20. The second stage of cooling is of the forced-oil type wherein the heat dissipated by the heat exchanger can be further increased by circulating the oil 13 through the radiators 20 and through the transformer tank by means of a pump 24, the intake side of which communicates with the lower header 19 and which exhausts into the lower end of casing 10.

The kva. rating of a transformer can often be increased approximately one-third by the use of forced air-cooling and as much as approximately two-thirds by forced oil-cooling means such as pumps forcing oil through the cooler, or heat exchanger. The natural convection circulation of oil is inadequate to dissipate the heat generated in the windings 11 when the load on the transformer exceeds the self-cooled rating, and when the load-current and the temperature of the oil increase sufficiently, a thermal responsive winding temperature relay 25 adapted to indicate the hot spot temperature of the winding 11 and to control operation of fan 23 and pump 24 in accordance with hot spot temperature is actuated to close a pair of normally open contacts 26 to complete an electrical circuit to the operating winding 35 of a fan relay 29. Operation of the fan relay 29 closes a first pair of normally open contacts 30 to complete an electrical circuit to a fan controller 31. The circuit for energization of fan controller 31 may be traced from one phase of the three phase supply line 32, conductor 33, contacts 30 of fan relay 29, conductor 34, operating winding 36 of fan controller 31, and conductor 37 to a second phase of the three phase supply line 32. In operating, fan relay 29 also closes a second pair of normally open contacts 38 to short-circuit taps 65 and 66 of heating coil 42 for a purpose to be described hereinafter.

Operation of fan controller 31 closes three pairs of normally open contacts 39 to connect the fan motor 22 to the three phases of the supply line 32 and thus increase the kva. capacity of the transformer.

The thermal responsive relay 25 includes a winding temperature indicator 40, a plurality of pairs 26, 27 and 28 of normally open contacts adapted to close at different predetermined temperatures, and a temperature sensitive element 41, preferably a bulb containing a volatizable fluid, in heat exchange relation with the cooling fluid 13 and with a heating coil 42 energized in proportion to the electrical current flowing through the winding 11. The bulb 41 is disposed in a generally cylindrical well member 43 mounted on the sidewall of casing 10 so as to protrude toward the interior of casing 10. The thermal responsive bulb 41 is connected by a capillary tube 44 to the winding temperature relay 25 which is mounted exterior of casing 10. The heating coil 42 surrounds the exterior surface of well 43 within casing 10 and is energized from the secondary of a current transformer 49 in series with one of the leads 16 to electrical transformer winding 11.

The fan 23 circulating air over the cooling radiators 20 is inadequate to dissipate the heat generated in the winding 11 when the load on the transformer exceeds the forced air-cooled rating, and when loads above the forced air-cooled rating increase the temperature of the oil and the heat generated by heating coil 42 sufficiently, the thermal relay 25 actuated from the thermal responsive bulb 41 in heat exchange relation with the dielectric fluid 13 and the heating coil 42 closes a second pair of contacts 27 to complete an energizing circuit to the operating winding 50 of pump relay 51. In operating, pump relay 51 closes a first set of normally closed contacts 52 to complete an energizing circuit to the operating winding 53 of a pump controller 54 over a circuit which may be traced from one phase of the supply line 32, conductor 33, normally open contacts 52 of pump relay 51, conductor 56, operating winding 53 of pump controller 54, and conductor 37 to another phase of the supply line. Pump relay 51 also closes a second pair of normally open contacts 59 to short circuit taps 64 and 66 of heating coil 42 for a purpose to be described hereinafter. In operating, pump controller 54 closes three pairs of normally open contacts 60 to connect the pump motor 61 to the three phases of the supply line and thus start the forced oil-cooled stage of the heat exchanger. The pump 24 is thus started when the top oil temperature and current transformer secondary current reach sufficiently high magnitudes, and operation of pump 24 results in circulation of oil 13 through the cooling radiators 20 to increase the load carrying capacity of the transformer by dissipating a greater amount of the heat generated in windings 11 and thus provide a higher kva. rating for the transformer.

Preferably the heating coil 42 and winding temperature relay 25 are calibrated so that the temperature shown on winding temperature indicator 40 and at which relay 25 actuates its contacts corresponds to the hot spot temperature calculated on winding 11 for a predetermined load on the transformer when both fan 23 and pump 24 are operating, i.e., for the forced oil-cooled rating when the cooling is a maximum. The amount of heat generated by heating coil 42 is indicative of the temperature differential between the winding 11 and the oil 13 at the forced oil-cooled rating, i.e., the highest transformer kva. rating, when the heat exchanger dissipates a maximum amount of heat, but the winding temperature indicator 40 will give erroneous readings and the contacts controlled by relay 25 will be actuated at other than the desired temperatures at the forced air-cooled rating or the self-cooled rating when the rate of cooling is decreased and less heat is removed from electrical winding 11 by the heat exchanger because coolant is not being circulated by pump 24 or the fan 23 is not circulating air over the external surface of cooling tubes 20. In order to automatically recalibrate the winding temperature relay 25 for variations in the rate of dissipating heat in the heat exchanger, means are provided to vary the amount of heat generated by heating coil 42 whenever the rate of cooling is changed.

Taps 64 and 66 to turns of the heating coil 42 are connected to the normally open contacts 59 of the pump relay 51, and taps 65 and 66 to turns of the heating coil 42 are connected to the normally open contacts 38 of the fan relay 29, and at the forced oil-cooled rating of the transformer when the rate of cooling is a maximum, a predetermined number of turns of heating coil 42 between taps 64 and 65 are short circuited by contacts 59 of pump relay 51 and also a predetermined number of turns of heating coil 42 between taps 65 and 66 (which are included in the turns between taps 64 and 66) are short circuited by contacts 38 of fan relay 29.

The relays and controllers are enclosed in a housing 67 mounted on the exterior of the transformer casing 10, and the tap leads 64, 65 and 66 extend from the interior of casing 10 into an outwardly extending compartment 68 near the upper end of the casing sidewall and are brought out through suitable gasketing means (not shown) and extend downwardly through a pipe 69 into the housing 67. The leads from the controllers to the fan and pump motors extend through a pipe 72 exterior of the casing 10.

Inasmuch as heating coil 42 is energized from current transformer 49, the short circuiting of turns of heating coil 42 does not change the current flowing through the heating coil 42 but rather varies the thermal characteristics of the heating coil and the number of watts of heat energy generated. When the transformer load decreases below the forced oil-cooled rating of the transformer, the temperature of the oil 13 and the heat generated by flow of current from the current transformer 49 through heating coil 42 decreases sufficiently until thermal relay 25 opens contacts 27 to release pump relay 51. Pump relay 51 releases and separates its contacts 52 to open the circuit to operating winding 53 of pump controller 54 and also opens contacts 59 to remove the short circuit between taps 64 and 66 of heating coil 42. Release of pump controller 54 opens the three sets of contacts 60 to open the energizing circuit to pump motor 61 and thus stop the forced oil-cooled stage and decrease the amount of heat dissipated by the heat exchanger. Removal of the short circuit between taps 64 and 66 energizes the turns of heating coil 42 between taps 64 and 65 (the turns between taps 65 and 66 still being short circuited by contacts 38) in accordance with the output of current transformer 49 and increases the heat energy output from heating coil 42. For a given transformer, the increase in hot spot temperature when pump 24 is not operating can be calculated, and the number of turns of heating element 42 short circuited by contacts 59 at the forced oil-cooled rating, and energized to generate heat energy after release of pump controller 54, is adjusted to give winding temperature indicator 40 the proper reading and to actuate contacts 26 and 27 of relay 25 at the desired hot spot temperatures when the rate of cooling is decreased due to stoppage of pump 24.

Similarly, when the transformer load drops below the forced air-cooled rating until the temperature of the oil 13 and the heat generated by flow of current transformer secondary current through heating coil 42 decreases sufficiently, winding temperature relay 25 opens contacts 26 to deenergize the operating winding 35 of fan relay 29. Fan relay 29 releases and separates its contacts 30 to open the circuit to the operating winding 36 of fan motor 22 and also separates its contacts 38 to remove the short circuit between taps 65 and 66 of heating coil 42. Stoppage of fan 23 decreases the amount of heat dissipated by the heat exchanger, and removal of the short circuit between taps 65 and 66 still further increases the number of turns of heating coil 42 energized by current derived from current transformer 49. The increase in temperature of winding 11 when fan 23 is stopped can be calculated, and the number of turns of heating coil 42 between taps 65 and 66 is adjusted to recalibrate relay 25 to give a proper reading of winding temperature indicator 40 and to actuate its contacts at the desired temperature at the self-cooled rating when both pump 24 and fan 23 are not operating.

The magnitude of the secondary current from current transformer 49 is proportional to the transformer load current, and at the self-cooled rating the secondary current from the current transformer 49 circulates through all of the turns of the heating coil 42. Should the load current be sufficient to increase the oil temperature and the watts of heat generated by the heating coil 42 until contacts 26 of winding temperature relay 25 close, the fan relay 29 is operated to operate fan 23 and thus start the stage of forced air-cooling and also to short circuit between taps 65 and 66 and thus reduce the number of turns of the heating coil 42 carrying current from the current transformer 49. Should the load increase further to raise the oil temperature and increase the heat generated by heating coil 42 sufficiently to close contacts 27 of winding temperature relay 25, pump relay 51 operates to short circuit additional turns of the heating coil 42 and to also start the forced oil-cooled stage, thereby further increasing the kva. rating of the transformer.

Although the invention has been illustrated and described as embodied in a transformer having a forced air-cooled stage accomplished by operation of fans and a forced oil-cooled stage accomplished by operation of pumps, it will be appreciated that the invention also comprehends the closing of the first set of contacts of the temperature winding relay to control the operation of a first bank of fans, pumps, or heat exchangers and the closure of the second set of contacts to control the operation of a second bank of fans, pumps, or heat exchangers. It will be apparent that the invention is also applicable to transformers having oil-to-air heat exchangers consisting of coolers with pumps and fans as well as to transformers having oil-to-water heat exchangers comprising coolers with pump and a cooling water supply.

Although the invention has been described as having for its object the correcting of the readings of the winding temperature relay for differences in the heat dissipated by the heat exchanger, it will be apparent that a visual winding temperature indicator is not essential to the invention and that the invention is applicable to recalibrate the temperature winding relay so that it actuates its contacts for controlling the operation of the fans and pumps at the desired hot spot temperatures regardless of whether a visual winding temperature indicator is provided.

In the embodiment illustrated in the drawing the temperature responsive relay 25 is provided with a third pair of normally open contacts 28 which are adapted when closed to complete an energizing circuit to an alarm 70 if the hot spot winding temperature exceeds a predetermined value.

It will be appreciated from the foregoing description that I have provided novel means for recalibrating the winding temperature relay of a forced-cooled transformer whenever the rate of cooling of the transformer is varied. While only a single embodiment of the invention has been illustrated and described, many modifications and variations thereof will be obvious to those skilled in the art without departing from the invention, and consequently it is intended in the appended claims to cover all such modifications and variations as fall within the true spirit and scope of the invention.

What I claim as new and desire to secure by Letters Patent of the United States is:

1. In encased stationary induction apparatus immersed in a cooling fluid within the casing and having a heat exchanger through which said cooling fluid may circulate, means for varying the amount of heat dissipated by said heat exchanger, a heating coil having taps between predetermined turns thereof immersed in said fluid and energized in proportion to the electrical current flowing through a winding of said stationary induction apparatus, means adapted when operated to short circuit between said taps, and thermal responsive means in heat exchange relationship with said heating coil and said fluid for simultaneously controlling the operation of both said short circuiting means and said heat dissipation varying means, whereby the heat generated by said heating coil is varied in accordance with changes in the rate of cooling of said apparatus and the response of said thermal responsive means is compensated for variations in the rate of cooling of said apparatus.

2. In encased stationary induction apparatus immersed in a cooling fluid within the casing, in combination, means for varying the amount of heat removed from said induction apparatus by said cooling fluid, a heating coil having taps between predetermined turns thereof immersed in said fluid, means including a current transformer for energizing said heating coil in proportion to the electrical current flowing through a winding of said stationary induction apparatus, means adapted when operated to short circuit between said taps, and thermal responsive means including a temperature sensitive element in heat exchange relation with said heating coil and with said fluid for simultaneously controlling the operation of both said short circuiting means and said heat removal varying means.

3. In force-cooled, encased stationary induction apparatus immersed in a cooling fluid within the casing, in combination, first and second stages of cooling for varying the amount of heat removed from said apparatus by said cooling fluid, a heating coil having a plurality of pairs of taps between predetermined turns thereof immersed in said fluid, means including a current transformer for energizing said heating coil in proportion to the electrical current flowing through a winding of said apparatus, a first relay having on set of contacts controlling said first stage of cooling and another set of contacts adapted to short circuit between a pair of said taps, a second relay having one set of contacts controlling said second stage of cooling and another set of contacts adapted to short circuit between a different pair of said taps, and thermal responsive winding temperature relay means including a temperature sensitive bulb in heat exchange relation with said fluid and said heating coil for operating said first relay at a first predetermined temperature of said winding and for operating said second relay at a different predetermined temperature of said winding, and a winding temperature indicator actuated by said temperature sensitive bulb.

4. In encased stationary induction apparatus immersed in a cooling fluid within the casing and having a cooler through which said cooling fluid may circulate, in combination, means for varying the amount of heat dissipated by said cooler, a heating coil having taps between predetermined turns thereof immersed in said fluid and energized in proportion to the electrical current flowing through a winding of said stationary induction apparatus, a temperature sensitive element in heat exchange relation with said heating coil and with said fluid, winding temperature indicating means actuated by said temperature sensitive element, means for short circuiting between said taps, and thermal responsive means actuated by said temperature sensitive element for simultaneously controlling said short circuiting means and said heat dissipation varying means, whereby the heat generated by said heating coil is varied in accordance with changes in the rate of cooling of said apparatus to compensate the response of said temperature indicating means and said thermal responsive means for variations in the rate of cooling of said apparatus.

5. In encased stationary induction apparatus immersed in a cooling fluid within the casing, means for circulating said fluid in heat exchange relation to said apparatus, a heating coil having taps between predetermined turns thereof immersed in said fluid, means including a current transformer for energizing said heating coil in proportion to the electrical current flowing through a winding of said apparatus, a first set of contacts for short circuiting between said taps, a second set of contacts adapted to control said fluid circulating means, and thermal responsive means including a temperature sensitive element in heat exchange relation with said heating coil and with said fluid for simultaneously actuating both of said sets of contacts, whereby the heat generated by said heating coil is varied consonant with the actuation of said fluid circulating means to compensate the response of said thermal responsive means for variations in the rate of cooling of said apparatus.

References Cited in the file of this patent

UNITED STATES PATENTS 2,682,173   Camilli _____ June 29, 1954

OTHER REFERENCES

"Thermostat Control for Triple-Rated Transformers," by H. A. Morgan, "Power Engineering," November 1943.

UNITED STATES PATENT OFFICE

CERTIFICATE OF CORRECTION

Patent No. 2,917,701                                             December 15, 1959

Harry D. Salton

It is hereby certified that error appears in the printed specification of the above numbered patent requiring correction and that the said Letters Patent should read as corrected below.

Column 7, line 21, for "on set" read -- one set --.

Signed and sealed this 17th day of May 1960.

(SEAL)
Attest:

KARL H. AXLINE                                           ROBERT C. WATSON
Attesting Officer                                    Commissioner of Patents